United States Patent
Yoshinami et al.

(10) Patent No.: US 9,011,596 B2
(45) Date of Patent: Apr. 21, 2015

(54) METHOD FOR PRODUCING CURED ARTICLE FROM HYDRAULIC COMPOSITION

(75) Inventors: Yusuke Yoshinami, Wakayama (JP);
Toshimasa Hamai, Wakayama (JP);
Hiroyuki Kawakami, Wakayama (JP);
Yohei Yoshikawa, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 14/001,988

(22) PCT Filed: Mar. 26, 2012

(86) PCT No.: PCT/JP2012/058777
§ 371 (c)(1),
(2), (4) Date: Aug. 28, 2013

(87) PCT Pub. No.: WO2012/133870
PCT Pub. Date: Oct. 4, 2012

(65) Prior Publication Data
US 2013/0333593 A1    Dec. 19, 2013

(30) Foreign Application Priority Data

Mar. 28, 2011 (JP) ................. 2011-070463
Jun. 24, 2011 (JP) ................. 2011-140368

(51) Int. Cl.
*C04B 28/02*    (2006.01)
*C04B 24/02*    (2006.01)
*C04B 28/04*    (2006.01)
*C04B 28/06*    (2006.01)

(52) U.S. Cl.
CPC .............. *C04B 24/02* (2013.01); *C04B 28/04* (2013.01); *C04B 28/06* (2013.01)

(58) Field of Classification Search
USPC .................. 106/696, 724, 802, 815
See application file for complete search history.

(56) References Cited

U.S. PATENT DOCUMENTS

| | | | |
|---|---|---|---|
| 5,340,385 A | 8/1994 | Arfaei et al. | |
| 5,348,583 A | 9/1994 | Arfaei et al. | |
| 5,935,318 A | 8/1999 | Angelskar et al. | |
| 2009/0078163 A1 | 3/2009 | Rossi et al. | |
| 2011/0021667 A1 | 1/2011 | Hamai et al. | |
| 2011/0100266 A1 | 5/2011 | Hamai et al. | |

FOREIGN PATENT DOCUMENTS

| | | |
|---|---|---|
| CN | 1131131 A | 9/1996 |
| CN | 1171378 A | 1/1998 |
| CN | 1216293 A | 5/1999 |
| CN | 1237556 A | 12/1999 |
| EP | 2520553 A1 | 11/2012 |
| JP | 64-83544 A | 3/1989 |
| JP | 6-19955 A | 1/1994 |
| JP | 6-199555 A | 7/1994 |
| JP | 2006-282414 A | 10/2006 |
| JP | 2008-519752 A | 6/2008 |
| JP | 2010-1196 A | 1/2010 |
| JP | 2011-42543 A | 3/2011 |
| WO | WO 2009/119893 A1 | 10/2009 |
| WO | WO 2009/119897 A1 | 10/2009 |
| WO | WO 2010/008093 A1 | 1/2010 |
| WO | WO 2011/081115 A1 | 7/2011 |
| WO | WO 2011110509 A1 * | 9/2011 |

OTHER PUBLICATIONS

International Search Report for PCT/JP2012/05877 mailed on Aug. 17, 2012.
Written Opinion of the International Searching Authority for PCT/JP2012/05877 mailed on Aug. 17, 2012.
International Preliminary Report on Patentability, and Written Opinion of the International Searching Authority, dated Oct. 10, 2013, for International Application No. PCT/JP2012/058777 (Forms PCT/IB/326, PCT/IB/373 and PCT/ISA/237).
An English translation of the Japanese Office Action, dated Feb. 3, 2015, issued in the corresponding Japanese Patent Application No. 2011-070463.
The Office Action, dated Feb. 3, 2015, issued in the corresponding Japanese Patent Application No. 2011-070463.
The First Office Action (Including an English translation), dated Oct. 11, 2014, issued in the corresponding Chinese Patent Application No. 201280011691.4.

* cited by examiner

*Primary Examiner* — Anthony J Green
(74) *Attorney, Agent, or Firm* — Birch, Stewart, Kolasch & Birch, LLP

(57) ABSTRACT

The present invention provides a method for producing a cured article of a hydraulic composition, prepared by mixing glycerol, cement and water, the hydraulic composition containing a sulfate ion, the method including step 1 of preparing the hydraulic composition such that a molar ratio of the sulfate ion to the glycerol, sulfate ion/glycerol, is 5.0 to 20 and the content of the sulfate ion is 3.0 to 15 parts by weight to 100 parts by weight of cement; and step 2 of aging and curing the hydraulic composition obtained in the step 1.

20 Claims, No Drawings

METHOD FOR PRODUCING CURED ARTICLE FROM HYDRAULIC COMPOSITION

FIELD OF THE INVENTION

The present invention relates to a method for producing a cured article from a hydraulic composition and the hydraulic composition.

BACKGROUND OF THE INVENTION

Secondary products of concrete are obtained by mixing materials including a cement, an aggregate, water, and a dispersant, molding in various forms, and curing. For these concretes, it is important to exhibit high strength early thereof from the viewpoint of productivity, or for enhancing the turnover rate of a form, because the form is repeatedly used many times. For this purpose, measures are taken, including (1) using a high early strength portland cement as a cement, (2) using various polycarboxylic acid compounds as an admixture to reduce the water content in the cement composition, and (3) steam curing the concrete.

Japanese Patent Publication JP-A No. 64-83544 describes a quick curing cement composition comprising a quick curing cement, polyol, and oxycarboxylic acid or a salt thereof. Japanese Patent Publication JP-A No. 2006-282414 describes a strength-improving agent for cement, comprising glycerol or a derivative thereof and a polycarboxylic acid copolymer at a specific ratio.

The current demands for further increased productivity and the like include a more shortened step of curing. For example, in production of some concrete products, concrete is required to exhibit high strength only for 8 or 24 hours of curing time. A general step of curing includes complicated operations such as heating with steam. The step is thus desirable to be shortened and simplified. It is also very commercially desirable to omit curing with steam.

It is also desirable to omit steam curing for reducing energy consumption, because of the large energy cost due to use of steam.

Japanese Patent Publication (JP-A) No. 06-19955 discloses that a combination of an accelerator and a low molecular weight glycol accelerates curing. Japanese Patent Publication JP-A 2008-519752 discloses that a raw glycerol improves compression strength. WO-A2011/081115, published on Jul. 7, 2011, discloses a hardening accelerator comprising glycerol and an alkali metal sulfate or thiosulfate. WO-A2009/119897 discloses a hardening accelerator comprising a glycol ether compound or a glycerol derivative, and optionally a phosphate ester polymer. WO-A2009/119893 discloses an additive comprising a copolymer and a glycol ether compound or a glycerol derivative. WO-A2010/008093 discloses a hardening accelerator comprising a reaction product of a polyhydric alcohol or an alkylene oxide-adduct thereof with a sulfating agent.

SUMMARY OF THE INVENTION

The present invention provides a method for producing a cured article of a hydraulic composition, including the steps of:

step 1 of preparing a hydraulic composition by mixing glycerol, cement and water, the hydraulic composition containing a sulfate ion, such that a molar ratio of sulfate ion to glycerol, sulfate ion/glycerol, is 5.0 to 20 and the content of sulfate ion is 3.0 to 15 parts by weight to 100 parts by weight of cement; and step 2 of aging and curing the hydraulic composition obtained in the step 1.

The present invention also relates to a hydraulic composition containing a sulfate ion, prepared by mixing raw materials containing glycerol, a cement, and water, wherein the content of the sulfate ion in the hydraulic composition is 3.0 to 15 parts by weight to 100 parts by weight of cement and the molar ratio of the sulfate ion to the glycerol, sulfate ion/glycerol, is 5.0 to 20.

The present invention provides use of the above shown hydraulic composition for increasing early strength.

DETAILED DESCRIPTION OF THE INVENTION

The present invention provides a method for achieving strength of a cured concrete or mortar after about 8 hours or about 24 hours from the preparation of a hydraulic composition (hereinafter, referred to as 8-hour strength and 24-hour strength, respectively).

In the present invention, the method for producing a cured article of a hydraulic composition, the article having the 8-hour strength and the 24-hour strength, is improved.

The present invention includes an embodiment of a method for producing a cured article of a hydraulic composition, including:

step 1 of preparing a hydraulic composition by mixing glycerol, cement and water, using raw materials of the hydraulic composition containing a substance containing a sulfate ion, such that a molar ratio of sulfate ion to glycerol, sulfate ion/glycerol, is 5.0 to 20 and the content of sulfate ion is 3.0 to 15 parts by weight to 100 parts by weight of cement; and step 2 of aging and curing the hydraulic composition obtained in step 1.

In the invention, the hydraulic composition contains a sulfate ion. The sulfate ion may be mixed with cement and water. The sulfate ion may be contained in the cement and an additional sulfate may optionally be added in step 1. The raw material for the hydraulic composition obtained in step 1 may contain glycerol, cement and water and then optionally an additional sulfate.

In the invention, the hydraulic composition contains a substance comprising a sulfate ion. The substance is generated by mixing cement with water. The substance containing a sulfate ion is a sulfate ion contained in cement and an additional sulfate which is optionally added in step 1.

The sulfate ion contained in cement and an additional sulfate may be the same as each other in view of the kind of a substance or a compound or be different from each other in view of the kind of a substance or a compound.

A mechanism of the effects of the present invention is presumed as follows.

The hydraulic composition according to the present invention is produced by mixing raw materials containing glycerol, cement, and water, wherein a raw material containing a sulfate ion is used. The hydraulic composition contains the sulfate ion (including those derived from the cement).

A general cement comprises the following components.

$C_3S$: $3CaO.SiO_2$ alite
$C_2S$: $2CaO.SiO_2$ belite
$C_3A$: $3CaO.Al_2O_3$ calcium aluminate
$C_4AF$: $4CaO.Al_2O_3.Fe_2O_3$ calcium aluminoferrite CaSO$_4$: calcium sulfate, gypsum (gypsum is often represented as sulfur trioxide in this art of field)

CaCO$_3$: calcium carbonate

CaO: calcium oxide

MgO: magnesium oxide

The hydration rate of C$_3$A is faster than that of C$_3$S and C$_2$S, and is involved in 8-hour or 24-hour strength.

In hydration of general cement, C$_3$A and calcium sulfate in a hydraulic composition are hydrated to obtain ettringite. When the reaction progresses and depletes calcium sulfate in the hydraulic composition, the ettringite reacts slowly with unreacted C$_3$A (for 30 to 50 hours) to obtain a monosulfate. Strength of a cured article occurs as a result of generation of the monosulfate.

Glycerol chelates a calcium ion of C$_3$A or calcium sulfate to accelerate dissociation of the calcium ion, thereby facilitating the reaction of C$_3$A and calcium sulfate to generate ettringite. Glycerol, however, also facilitates the reaction of C$_3$A with water to generate a C-A-H phase. An excess amount of glycerol will therefore decrease the final amount of a monosulfate generated in the hydraulic composition, resulting in difficulty in achieving the 8-hour strength and the 24-hour strength.

A sulfate ion reacts with a calcium ion derived from other than C$_3$A in the cement to obtain calcium sulfate. The more sulfate ions the hydraulic composition contains, the more monosulfate is finally generated in the hydraulic composition. However, the reaction of ettringite to generate the monosulfate does not progress when a hydraulic composition contains calcium sulfate, resulting in difficulty in improving 24-hour strength.

Considering these conditions, enhancement of both 8-hour strength and 24-hour strength can be achieved by balancing glycerol and a sulfate ion.

In the present invention, glycerol, a cement, and water are used to prepare the hydraulic composition. Below, these components will be described in detail.

<Cement>

Examples of the cement include normal portland cement, high early strength portland cement, ultra early strength portland cement, and eco-cement (e.g., JIS R5214).

For preventing quick setting to obtain sufficient operating time, for example, for filling in a flame, any of the cements described above generally contains a sulfate ion (calcium sulfate).

The content of sulfate ion in cement is generally represented as the amount of sulfur trioxide. Japanese major cement manufacturers disclose information about Japanese normal portland cement showing that the cement contains about 2% by weight of sulfur trioxide. For example, Taiheyo Cement Corporation describes on their website thereof that their cement contains 2.10% by weight of sulfur trioxide (URL: http://www.taiheiyo-cement.co.jp/service_product/cement/pdf/ncement_v2.pdf, retrieved on Jan. 26, 2011). Sumitomo Osaka Cement Co., Ltd. describes on their website thereof that their cement contains 1.95% by weight of sulfur trioxide (URL: http://www.soc.co.jp/cement/shohin/index.html, retrieved on Jan. 26, 2011). Ube-Mitsubishi Cement Corporation describes on their website thereof that their cement contains 2.16% by weight of sulfur trioxide (URL: http://www.umcc.co.jp/html_set/products/main-_seihin_fs_seih in_new.html/, retrieved on Jan. 26, 2011).

As thus, in the present invention, cement can be used as a raw material containing a sulfate ion for producing a hydraulic composition (sulfate ion-containing cement).

For preventing quick setting of a hydraulic composition and increasing 8-hour strength, the content of C$_3$A in cement is preferably 5 to 9% by weight, and more preferably 7 to 9% by weight.

The content of C$_3$A in cement is determined by X-ray analysis (Rietveld refinement). The obtained value is calculated to a value per hydraulic composition.

The hydraulic composition according to the present invention can further contain a hydraulic powder other than a cement, including blast furnace slag, fly ash, silica fume, etc. and the like. The hydraulic composition also further may contain a nonhydraulic limestone fine powder and the like. Mixed cements such as silica fume cement and blast furnace cement may also be used.

<Sulfate>

For improving 8-hour strength and 24-hour strength, the present invention not only utilizes a sulfate ion contained in cement, but also an additional sulfate which can be added in step 1 to adjust the amount of sulfate ion and then the molar ratio of the sulfate ion to glycerol. In the present invention, a sulfate thus can be used as a raw material containing a sulfate ion for the hydraulic composition.

The sulfate may be a compound which generates a sulfate ion in the hydraulic composition. Examples of the sulfate include inorganic sulfates composed of a sulfate ion and an ion selected from alkaline earth metal, alkali metal, and ammonium ions. The sulfate is preferably an alkaline earth metal or alkali metal salt of sulfuric acid, and more preferably an alkaline earth metal salt, and even more preferably calcium sulfate contained as a main ingredient in gypsum dihydrate (CaSO$_4$.2H$_2$O), gypsum anhydrite (CaSO$_4$), or the like. In the present invention, the sulfate used can be gypsum, for example, selected from gypsum dihydrate and gypsum anhydrite.

The amount of the sulfate added can be appropriately determined, taking an amount of sulfate ion derived from cement and the like into account, within the range such that the content of sulfate ion in the hydraulic composition is 3.0 to 15 parts by weight to 100 parts by weight of cement. For increasing 8-hour strength and 24-hour strength, the amount added is preferably 0.1 to 12 parts by weight, more preferably 0.1 to 7 parts by weight, even more preferably 0.1 to 3 parts by weight, and even more preferably 0.3 to 0.7 parts by weight, based on the sulfate ion, to 100 parts by weight of cement. The amount of the cement in this case is the amount of the cement used as a raw material before being mixed with water.

<Content of Sulfate Ion in Hydraulic Composition>

For increasing 8-hour strength and from the economic viewpoint, the content of sulfate ion in the hydraulic composition is preferably 3.0 to 15 parts by weight, more preferably 3.0 to 10 parts by weight, even more preferably 3.0 to 6.0 parts by weight, even more preferably 3.0 to 5.0 parts by weight, and yet even more preferably 3.0 to 3.5 parts by weight to 100 parts by weight of cement. The amount of the cement in this case is the amount of the cement used as a raw material before being mixed with water.

In the present invention, the amount of sulfate ion in the hydraulic composition may be the total amount of that being present in the form of an ionic bond in a compound of the hydraulic composition and that being present in the form of a free sulfate ion in the aqueous phase of the hydraulic composition. The sulfate ion in the hydraulic composition is generally provided from a cement and an agent (or material) other than the cement. The content of sulfate ion in the hydraulic composition can be determined, for example, by measuring the amount of calcium sulfate in the cement and calculating the amount of the sulfate ion from the determined amount and adding the amount of sulfate in agents (or materials) other than the cement to obtain the total. A specific process of measuring the content of calcium sulfate in cement will be described in the Examples.

<Glycerol>

For increasing 8-hour strength and 24-hour strength, the hydraulic composition of the present invention contains glycerol.

As the glycerol, commercially available purified glycerols such as those prepared by transesterification of palm fats and oils can be used. Crude brines resulting from hydrolysis of beef tallow and vegetable fats and oils and purified brines obtained from crude brines by removing impurities, can also be used. For increasing 8-hour strength, preferred are crude brines and purified glycerols, and more preferred are purified glycerols.

<Content of Glycerol in Hydraulic Composition>

For increasing 8-hour strength and 24-hour strength, the content of glycerol in the hydraulic composition is preferably 0.15 to 1.3 parts by weight, more preferably 0.20 to 1.0 parts by weight, even more preferably 0.25 to 0.80 parts by weight, and even more preferably 0.30 to 0.60 parts by weight to 100 parts by weight of cement. Glycerol is generally not contained in cement or aggregate. It is provided by adding an agent (or material) other than the cement and the aggregate. The content of glycerol in the hydraulic composition thus can be determined from the amount of glycerol used for preparing the hydraulic composition. For increasing 8-hour strength and 24-hour strength, in step 1, the present invention preferably adds glycerol in an amount of 0.15 to 1.3 parts by weight, more preferably 0.20 to 1.0 parts by weight, even more preferably 0.25 to 0.80 parts by weight, and even more preferably 0.30 to 0.60 parts by weight to 100 parts by weight of cement (that which is used as a raw material).

<Content of $C_3A$ in Hydraulic Composition>

$C_3A$ is generally provided from a cement and an agent (or material) other than the cement. In the present invention, the content of $C_3A$ in the hydraulic composition thus can be determined from the content of $C_3A$ in the cement and in the agent(s) (or material) containing $C_3A$ other than the cement. Examples of the agent containing $C_3A$ other than the cement include calcium aluminate.

For suppressing quick setting and increasing 8-hour strength of the hydraulic composition, the content of $C_3A$ in the hydraulic composition is preferably 1.0 to 2.5% by weight, and more preferably 1.5 to 2.5% by weight. For increasing 24-hour strength, the content is preferably 1.0 to 1.5% by weight.

<Content of Water in Hydraulic Composition>

In case of concrete, for enhancing the filling properties of a concrete in filling a frame, the content of water in the hydraulic composition is preferably not less than 5% by weight. For suppressing breeding water to reduce surface defects and increasing 8-hour strength and 24-hour strength, the content of water is preferably not more than 8% by weight, more preferably not more than 7.5% by weight, and even more preferably not more than 7% by weight. Putting them together, in case of concrete, the content of water is preferably 5 to 8% by weight, more preferably 5 to 7.5% by weight, and even more preferably 5 to 7% by weight.

In the case of mortar, for enhancing the filling properties of a concrete in filling a frame, the content of water in the hydraulic composition is preferably not less than 5% by weight, more preferably not less than 7% by weight, and even more preferably not less than 9% by weight. For suppressing breeding water to reduce surface defects and increasing 8-hour strength and 24-hour strength, the content of water is preferably not more than 25% by weight, more preferably not more than 18% by weight, even more preferably not more than 15% by weight, and even more preferably not more than 13% by weight. Putting them together, in case of mortar, the content of water is preferably 5 to 25% by weight, more preferably 7 to 18% by weight, even more preferably 7 to 15% by weight, and even more preferably 9 to 13% by weight.

In the present invention, for increasing 8-hour strength and 24-hour strength, the weight ratio of water to cement is, as represented by water/cement×100, preferably 20 to 60, and more preferably 30 to 50. In step 1, water and cement are preferably mixed at such a weight ratio.

<Molar Ratio of Sulfate Ion to Glycerol>

For increasing 8-hour strength and 24-hour strength, in the hydraulic composition of the present invention, the molar ratio of sulfate ion to glycerol, sulfate ion/glycerol, is 5.0 to 20. For increasing 8-hour strength, the molar ratio is preferably 5.0 to 12, more preferably 6.0 to 11, even more preferably 7.0 to 10, and even more preferably 8.0 to 9.5. For increasing 24-hour strength, the molar ratio of sulfate ion to glycerol, sulfate ion/glycerol, is preferably 6.5 to 12.

<Alkali Metal Ion>

For increasing 8-hour strength and 24-hour strength, the hydraulic composition of the present invention preferably further contains an alkali metal ion. The alkali metal ion comes from a compound containing the alkali metal ion, and preferably an inorganic compound containing the alkali metal. Examples of the inorganic compound containing the alkali metal include alkali metal sulfates, alkali metal hydroxides, and alkali metal nitrates. Examples of the alkali metal sulfate include sodium sulfate, potassium sulfate, and lithium sulfate. Examples of the alkali metal hydroxide include sodium hydroxide, potassium hydroxide, and lithium hydroxide. Examples of the alkali metal nitrate include sodium nitrate, potassium nitrate, and lithium nitrate.

For increasing 8-hour strength and 24-hour strength and from the economic viewpoint, the content of the alkali metal ion in the hydraulic composition is preferably 0.05 to 1.0 parts by weight, more preferably 0.08 to 0.50 parts by weight, even more preferably 0.10 to 0.30 parts by weight, and even more preferably 0.15 to 0.25 parts by weight to 100 parts by weight of cement. The amount of the cement in this relation is the amount of the cement used as a raw material.

In the present invention, the content of the alkali metal ion in the hydraulic composition can be determined from the amount of the compound containing the alkali metal ion such as an alkali metal sulfate used for preparing the hydraulic composition.

For increasing 8-hour strength and 24-hour strength, the present invention preferably further adds a compound containing both a sulfate ion and an alkali metal ion. Particularly used are alkali metal sulfates. Preferred are sodium sulfate, potassium sulfate, and lithium sulfate, and more preferred is sodium sulfate.

For increasing 8-hour strength and 24-hour strength, the amount of the alkali metal sulfate added is preferably 0.1 to 2.5 parts by weight, more preferably 0.2 to 1.2 parts by weight, even more preferably 0.25 to 0.7 parts by weight, and even more preferably 0.4 to 0.6 parts by weight to 100 parts by weight of cement.

<Other Component>

For decreasing the amount of hydraulic powders such as a cement to cut materials costs, the hydraulic composition according to the present invention may further contain an aggregate. Examples of the aggregates include coarse aggregates and fine aggregates. Preferred examples of the coarse aggregates include pit gravel, land gravel, river gravel, and crushed gravel. Preferred examples of the fine aggregates include pit sand, land sand, river sand, and crushed sand. In cases of concrete, for achieving strength of the hydraulic composition, reducing the amount of hydraulic powders such as cement used, and enhancing filling properties into a flame or the like, the amount of the coarse aggregate used is preferably 50 to 100%, more preferably 55 to 90%, and even more preferably 60 to 80% by bulk volume. For enhancing filling properties into a frame or the like, the amount of the fine aggregate used is preferably 500 to 1000 kg/m$^3$, more preferably 600 to 900 kg/m$^3$, and even more preferably 700 to 900 kg/m$^3$. In cases of mortar, the amount of the fine aggregate used is preferably 800 to 2000 kg/m$^3$, more preferably 900 to 1800 kg/m$^3$, and even more preferably 1000 to 1600 kg/m$^3$. According to the intended use, a lightweight aggregate may be used. Terms of aggregate are in accordance with "Concrete souran (Comprehensive bibliography of concrete)" (Jun. 10, 1998, Gijyutsu Shoin).

For increasing fluidity, the hydraulic composition of the present invention may contain a dispersant according to need. There are known dispersants, including phosphate ester polymers, polycarboxylic acid copolymers, sulfonic acid copolymers, naphthalene polymers, melamine polymers, phenol polymers, lignin polymers, and the like. The dispersant may be used as an admixture with other ingredient.

For the hydraulic composition to be used for secondary products of concrete, preferred dispersants are naphthalene polymers and polycarboxylic acid copolymers. The amount of the dispersant used is preferably 0.1 to 3.0 parts by weight, and more preferably 0.1 to 1.0 parts by weight as the solid to 100 parts by weight of cement.

The hydraulic composition of the present invention may further contain other additives. Examples of additives include AE agents such as resin soaps, saturated and unsaturated fatty acids, sodium hydroxystearate, lauryl sulfate, alkylbenzenesulfonic acids and salts thereof, alkane sulfonates, polyoxyalkylene alkyl(or alkylphenyl)ethers, polyoxyalkylene alkyl (or alkylphenyl)ether sulfuric acid esters and salts thereof, polyoxyalkylene alkyl(or alkylphenyl)ether phosphoric acid esters and salts thereof, protein materials, alkenyl succinic acids, and α-olefin sulfonates; retarders such as oxycarboxylic acid retarders (e.g., gluconic acid, glucoheptonic acid, arabonic acid, malic acid, and citric acid), sugar retarders (e.g., dextrin, monosaccharides, oligosaccharides, and polysaccharides), and sugar alcohol retarders; foaming agents; viscous agents; silica sands; accelerators such as soluble calcium salts, such as calcium chloride, calcium nitrite, calcium nitrate, calcium bromide, and calcium iodide, chlorides, such as iron chloride, and magnesium chloride, potassium hydroxide, carbonates, formic acid and salts thereof; waterproofing agents such as resins and salts thereof, fatty acid esters, fats and oils, silicones, paraffins, asphalts, and waxes; fluidizing agents; defoaming agents such as dimethylpolysiloxanes, polyalkylene glycol fatty acid esters, mineral oils, fats and oils, oxyalkylenes, alcohols, and amides; corrosion inhibitors such as nitrites, phosphates, and zinc oxide; water-soluble polymers such as celluloses (e.g., methylcellulose and hydroxyethyl cellulose), natural polymers (e.g., β-1,3-glucan and xanthane gum), and synthetic polymers (e.g., polyacrylic acid amides, polyethylene glycols, ethylene oxide adducts of oleyl alcohol, and reaction products of these adducts with vinylcyclohexene diepoxide); and polymer emulsions such as of alkyl (meth)acrylates.

The present invention produces a cured article from the specified hydraulic composition. The hydraulic composition of the present invention exhibits its strength, for example, after about 8 hours or about 24 hours from preparation. Thus the cured article thereof is used preferably as a good secondary product of concrete, because a form or a frame can be repeatedly used at a high turnover rate. The hydraulic composition prepared according to the present invention has fluidity for about 30 minutes from preparation, for example, having a sufficient fluidity for 30 minutes to allow workability such as filling, and is suitably used in concrete which loses its fluidity after 30 minutes have passed.

The method for producing a cured article of the hydraulic composition of the present invention, includes:

step 1 of preparing a hydraulic composition by mixing glycerol, cement and water, raw materials of the hydraulic composition containing a substance containing a sulfate ion, such that the molar ratio of sulfate ion to glycerol, sulfate ion/glycerol, is 5.0 to 20 and the content of sulfate ion is 3.0 to 15 parts by weight to 100 parts by weight of cement; and step 2 of aging and curing the hydraulic composition obtained in the step 1.

The invention method includes, in other words, a method for producing a cured article from a hydraulic composition prepared by mixing raw materials containing glycerol, cement and water, wherein raw materials contain a sulfate ion, including step 1 of preparing the hydraulic composition such that the molar-ratio of the sulfate ion to the glycerol, sulfate ion/glycerol, is 5.0 to 20 and the content of the sulfate ion is 3.0 to 15 parts by weight to 100 parts by weight of cement; and step 2 of aging and curing the hydraulic composition obtained in the step 1.

In step 1, raw materials of the hydraulic composition comprising at least glycerol, cement, and water are used, and at least one of the raw materials comprises a sulfate ion. The amount of sulfate ion is determined from the amount of calcium sulfate contained the cement according to need. For enhancing 8-hour strength and 24-hour strength, in step 1, a sulfate can be further mixed as the raw material. Components used in step 1 can be mixed in any form. In the case of using a sulfate, glycerol and the sulfate may be mixed first, and the mixture may be mixed with other components including cement and water. It is also possible that glycerol and sulfate may be separately mixed with other components including cement and water. In one embodiment of step 1, a hydraulic composition is prepared by confirming the amount of sulfate ion in all the materials used to prepare the hydraulic composition (cement, glycerol, water and optional components added according to need), for example, by measuring the amount of sulfate ion in a material, or by using a material containing a sulfate ion in a known amount to determine mixing proportions (mixing amounts) of materials such that the molar ratio of the sulfate ion to the glycerol, sulfate ion/glycerol, is 5.0 to 20 and the content of the sulfate ion is 3.0 to 15 parts by weight to 100 parts by weight of cement, and mixing the cement, the glycerol, the water, and the optional component. For increasing 8-hour strength, the molar ratio of the sulfate ion to the glycerol is preferably 5.0 to 12, more preferably 6.0 to 11, even more preferably 7.0 to 10, and even more preferably 8.0 to 9.5. For increasing 8-hour strength and 24-hour strength, the sulfate ion is blended such that the content of the sulfate ion is preferably 3.0 to 10 parts by weight, more preferably 3.0 to 6.0 parts by weight, even more preferably 3.0 to 5.0 parts by weight, and even more preferably 3.0 to 3.5 parts by weight to 100 parts by weight of cement.

In step 2, the hydraulic composition is filled in a frame and cured. After step 2, there may be a step of demolding the cured hydraulic composition. In the present invention, curing of the hydraulic composition is promoted. The time it takes from preparation to demolding of the hydraulic composition thus can be shortened. For achieving the necessary strength for demolding, while improving cycle of production, the time it takes from preparation to demolding of the hydraulic composition or the time it takes from the contact between a hydraulic powder such as cement and water to demolding is preferably 4 to 24 hours, more preferably 4 to 10 hours, and even more preferably 6 to 10 hours.

As curing of step 2, autoclave curing, steam curing, curing at ambient temperature, or the like can be performed. The hydraulic composition of the present invention does not require energy for promoting curing such as steam heat, and can produce a cured article such as a concrete product without steam curing. For example, in step 2 of the method for producing a cured article from the hydraulic composition of the present invention, the time of holding the hydraulic composition at a curing temperature of not less than 50° C. can be not more than one hour, and particularly not more than 0.5 hours. For achieving the necessary strength for demolding, while improving the cycle of production in the production of concrete without steam curing, the time it takes from contact between a hydraulic powder such as cement and water in preparation of the hydraulic composition to demolding, and the time for curing is preferably 4 to 24 hours, more preferably 4 to 16 hours, even more preferably 4 to 10 hours, even more preferably 6 to 10 hours, and even more preferably 7 to 9 hours. During this time, the curing temperature is preferably 0 to 40° C., and more preferably 10 to 40° C.

The method for producing a cured article from the hydraulic composition of the present invention enhances productivity of the cured article or the concrete product such as a secondary product of concrete. The method is thus excellent in the reduction of environmental burdens. Examples of secondary products of concrete produced from the hydraulic composition by curing in a frame include products for civil engineering such as various blocks for revetment, box culvert products, segments for tunnel work, and girders for bridge piers, and products for construction such as building members for a curtain wall, post, beam, and floorboard.

Below, the embodiments of the present invention will be described.

<1>
A method for producing a cured article of a hydraulic composition, including the steps of:
step 1 of preparing a hydraulic composition by mixing glycerol, cement and water, the hydraulic composition containing a sulfate ion, such that a molar ratio of sulfate ion to glycerol, sulfate ion/glycerol, is 5.0 to 20 and the content of sulfate ion is 3.0 to 15 parts by weight to 100 parts by weight of cement; and
step 2 of aging and curing the hydraulic composition obtained in the step 1.

<2>
The method for producing a cured article according to <1>, wherein a sulfate is further added in step 1.

<3>
The method for producing a cured article according to <2>, wherein the sulfate is preferably an inorganic sulfate, more preferably at least one sulfate selected from the group consisting of alkaline earth metal sulfates and alkali metal sulfates, and even more preferably gypsum selected from gypsum dihydrate and gypsum anhydrite.

<4>
The method for producing a cured article according to <2> or <3>, wherein the amount of the added sulfate is preferably 0.1 to 12 parts by weight, more preferably 0.1 to 7 parts by weight, even more preferably 0.1 to 3 parts by weight, and even more preferably 0.3 to 0.7 parts by weight to 100 parts by weight of cement.

<5>
The method for producing a cured article according to any one of <1> to <4>, wherein the glycerol is mixed in an amount of 0.15 to 1.3 parts by weight to 100 parts by weight of cement in step 1.

<6>
The method for producing a cured article according to any one of <1> to <5>, wherein the cement comprises calcium aluminate (hereinafter, referred to as $C_3A$) in an amount of 1.0 to 2.5% by weight of the hydraulic composition.

<7>
The method for producing a cured article according to any one of <1> to <6>, wherein the time of holding the hydraulic composition at an aging and curing temperature of not less than 50° C. is not more than one hour in step 2.

<8>
The method for producing a cured article according to any one of <1> to <7>, wherein the molar ratio of the sulfate ion to the glycerol, sulfate ion/glycerol, is preferably 5.0 to 12, more preferably 6.0 to 11, even more preferably 7.0 to 10, and even more preferably 8.0 to 9.5.

<9>
The method for producing a cured article according to any one of <1> to <8>, wherein the content of the sulfate ion in the hydraulic composition is preferably 3.0 to 10 parts by weight, more preferably 3.0 to 6.0 parts by weight, even more preferably 3.0 to 5.0 parts by weight, and even more preferably 3.0 to 3.5 parts by weight to 100 parts by weight of cement.

<10>
The method for producing a cured article according to any one of <1> to <9>, wherein the content of the glycerol in the hydraulic composition is preferably 0.15 to 1.3 parts by weight, more preferably 0.20 to 1.0 parts by weight, even more preferably 0.25 to 0.80 parts by weight, and even more preferably 0.30 to 0.60 parts by weight to 100 parts by weight of cement.

<11>
The method for producing a cured article according to any one of <1> to <10>, wherein the content of the $C_3A$ in the hydraulic composition is preferably 1.5 to 2.5% by weight.

<12>
The method for producing a cured article according to any one of <1> to <10>, wherein the content of the $C_3A$ in the hydraulic composition is preferably 1.0 to 1.5% by weight.

<13>
The method for producing a cured article according to any one of <1> to <12>, wherein the hydraulic composition contains an alkali metal ion.

<14>
The method for producing a cured article according to <13>, wherein the content of the alkali metal ion in the hydraulic composition is preferably 0.05 to 1.0 parts by weight, more preferably 0.08 to 0.50 parts by weight, even more preferably 0.10 to 0.30 parts by weight, and even more preferably 0.15 to 0.25 parts by weight to 100 parts by weight of cement.

<15>
A hydraulic composition, prepared by mixing glycerol, a cement, and water, comprising a sulfate ion,
wherein the content of the sulfate ion in the hydraulic composition is 3.0 to 15 parts by weight to 100 parts by weight of cement, and
the molar ratio of the sulfate ion to the glycerol in the hydraulic composition, sulfate ion/glycerol, is 5.0 to 20.

<16>

The hydraulic composition according to <15>, prepared by further adding a sulfate.

<17>

The hydraulic composition according to <16>, wherein the sulfate is preferably an inorganic sulfate, more preferably at least one sulfate selected from the group consisting of alkaline earth metal sulfates and alkali metal sulfates, and even more preferably gypsum selected from gypsum dihydrate and gypsum anhydrite.

<18>

The hydraulic composition according to <16> or <17>, wherein the amount of the sulfate added is preferably 0.1 to 12 parts by weight, more preferably 0.1 to 7 parts by weight, even more preferably 0.1 to 3 parts by weight, and even more preferably 0.3 to 0.7 parts by weight to 100 parts by weight of cement.

<19>

The hydraulic composition according to any one of <16> to <18>, wherein the content of the glycerol in the hydraulic composition is 0.15 to 1.3 parts by weight to 100 parts by weight of cement.

<20>

The hydraulic composition according to any one of <15> to <19>, wherein the cement comprises $C_3A$, and the content of the $C_3A$ in the hydraulic composition is 1.0 to 2.5% by weight.

<21>

The hydraulic composition according to any one of <15> to <20>, wherein the hydraulic composition is concrete, and the content of water in the hydraulic composition is 5 to 8% by weight.

<22>

The hydraulic composition according to any one of <15> to <20>, wherein the hydraulic composition is mortar, and the content of water in the hydraulic composition is 5 to 25% by weight.

<23>

The hydraulic composition according to any one of <15> to <22>, wherein the content of the glycerol in the hydraulic composition is 0.15 to 1.3 parts by weight to 100 parts by weight of cement.

<24>

The hydraulic composition according to any one of <15> to <23>, wherein the cement comprises $C_3A$, and the content of the $C_3A$ in the hydraulic composition is 1.0 to 2.5% by weight.

<25>

The hydraulic composition according to <16>, wherein the amount of the added sulfate is 0.1 to 12 parts by weight to 100 parts by weight of cement.

<26>

The hydraulic composition according to any one of <15> to <25>, wherein the molar ratio of the sulfate ion to the glycerol, sulfate ion/glycerol, is 5.0 to 12.

<27>

The hydraulic composition according to any one of <15> to <26>, wherein the molar ratio of the sulfate ion to the glycerol, sulfate ion/glycerol, is preferably 5.0 to 12, more preferably 6.0 to 11, even more preferably 7.0 to 10, and even more preferably 8.0 to 9.5.

<28>

The hydraulic composition according to <15> or <27>, wherein the amount of the sulfate ion in the hydraulic composition is preferably 3.0 to 10 parts by weight, more preferably 3.0 to 6.0 parts by weight, even more preferably 3.0 to 5.0 parts by weight, and even more preferably 3.0 to 3.5 parts by weight to 100 parts by weight of cement.

<29>

The hydraulic composition according to any one of <15> to <28>, wherein the content of the glycerol in the hydraulic composition is preferably 0.15 to 1.3 parts by weight, more preferably 0.20 to 1.0 parts by weight, even more preferably 0.25 to 0.80 parts by weight, and even more preferably 0.30 to 0.60 parts by weight to 100 parts by weight of cement.

<30>

The hydraulic composition according to any one of <15> to <29>, wherein the content of the $C_3A$ in the hydraulic composition is preferably 1.5 to 2.5% by weight.

<31>

The hydraulic composition according to any one of <15> to <30>, wherein the content of the $C_3A$ in the hydraulic composition is preferably 1.0 to 1.5% by weight.

<32>

The method for producing a cured article according to any one of <15> to <31>, wherein the hydraulic composition contains an alkali metal ion.

<33>

The hydraulic composition according to <32>, wherein the content of the alkali metal ion in the hydraulic composition is preferably 0.05 to 1.0 parts by weight, more preferably 0.08 to 0.50 parts by weight, even more preferably 0.10 to 0.30 parts by weight, and even more preferably 0.15 to 0.25 parts by weight to 100 parts by weight of cement.

<34>

The hydraulic composition according to any one of <15> to <21> and <23> to <33>, wherein the hydraulic composition is concrete, and the content of water in the hydraulic composition is preferably 5 to 7.5% by weight, and more preferably 5 to 7% by weight.

<35>

The hydraulic composition according to any one of <15> to <22> and <24> to <33>, wherein the hydraulic composition is mortar, and the content of water in the hydraulic composition is preferably 7 to 18% by weight, more preferably 7 to 15% by weight, and even more preferably 9 to 13% by weight.

<36>

Use of a hydraulic composition for increasing early strength, in which the hydraulic composition is prepared by mixing glycerol, a cement, and water, the hydraulic composition containing a sulfate ion, such that the molar ratio of the sulfate ion to the glycerol, sulfate ion/glycerol, is 5.0 to 20, and the content of the sulfate ion is 3.0 to 15 parts by weight to 100 parts by weight of cement.

<37>

The use of the hydraulic composition for increasing early strength according to <36>, wherein sulfate is further added to the hydraulic composition.

<38>

The use of the hydraulic composition for increasing early strength according to <37>, wherein the sulfate is preferably an inorganic sulfate, more preferably at least one sulfate selected from the group consisting of alkaline earth metal sulfates and alkali metal sulfates, and even more preferably gypsum selected from gypsum dihydrate and gypsum anhydrite.

<39>

The use of the hydraulic composition for increasing early strength according to <37> or <38>, wherein the amount of the sulfate added is preferably 0.1 to 12 parts by weight, more preferably 0.1 to 7 parts by weight, even more preferably 0.1 to 3 parts by weight, and even more preferably 0.3 to 0.7 parts by weight to 100 parts by weight of cement.

<40>

The use of the hydraulic composition for increasing early strength according to any one of <36> to <39>, wherein the glycerol is mixed in an amount of 0.15 to 1.3 parts by weight to 100 parts by weight of cement.

<41>

The use of the hydraulic composition for increasing early strength according to any one of <36> to <40>, wherein the cement comprises calcium aluminate (hereinafter, referred to as $C_3A$) in an amount of 1.0 to 2.5% by weight of the hydraulic composition.

<42>

The use of the hydraulic composition for increasing early strength according to any one of <36> to <41>, wherein the time of holding the hydraulic composition at the aging and curing temperature of not less than 50° C. is not more than one hour.

<43>

The use of the hydraulic composition for increasing early strength according to any one of <36> to <42>, wherein the hydraulic composition is concrete, and the content of water in the hydraulic composition is 5 to 8% by weight.

<44>

The use of the hydraulic composition for increasing early strength according to any one of <36> to <43>, wherein the hydraulic composition is mortar, and the content of water in the hydraulic composition is 5 to 25% by weight.

<45>

The use of the hydraulic composition for increasing early strength according to any one of <36> to <44>, wherein the content of the glycerol in the hydraulic composition is 0.15 to 1.3 parts by weight to 100 parts by weight of cement.

<46>

The use of the hydraulic composition for increasing early strength according to any one of <36> to <45>, wherein the cement comprises $C_3A$, and the content of the $C_3A$ in the hydraulic composition is 1.0 to 2.56 by weight.

<47>

The use of the hydraulic composition for increasing early strength according to <37>, wherein the amount of the sulfate added is 0.1 to 12 parts by weight to 100 parts by weight of cement.

<48>

The use of the hydraulic composition for increasing early strength according to any one of <36> to <47>, wherein the molar ratio of the sulfate ion to the glycerol, sulfate ion/glycerol, is 5.0 to 12.

<49>

The use of the hydraulic composition for increasing early strength according to any one of <36> to <48>, wherein the molar ratio of the sulfate ion to the glycerol, sulfate ion/glycerol, is preferably 5.0 to 12, more preferably 6.0 to 11, even more preferably 7.0 to 10, even more preferably 8.0 to 9.5.

<50>

The use of the hydraulic composition for increasing early strength according to any one of <36> to <49>, wherein the amount of the sulfate ion in the hydraulic composition is preferably 3.0 to 10 parts by weight, more preferably 3.0 to 6.0 parts by weight, even more preferably 3.0 to 5.0 parts by weight, and even more preferably 3.0 to 3.5 parts by weight to 100 parts by weight of cement.

<51>

The use of the hydraulic composition for increasing early strength according to any one of <36> to <50>, wherein the content of the glycerol in the hydraulic composition is preferably 0.15 to 1.3 parts by weight, more preferably 0.20 to 1.0 parts by weight, even more preferably 0.25 to 0.80 parts by weight, and even more preferably 0.30 to 0.60 parts by weight to 100 parts by weight of cement.

<52>

The use of the hydraulic composition for increasing early strength according to any one of <36> to <51>, wherein the content of the $C_3A$ in the hydraulic composition is preferably 1.5 to 2.5% by weight.

<53>

The use of the hydraulic composition for increasing early strength according to any one of <36> to <52>, wherein the content of the $C_3A$ in the hydraulic composition is preferably 1.0 to 1.5% by weight.

<54>

The method for producing a cured article according to any one of <36> to <53>, wherein the hydraulic composition contains an alkali metal ion.

<55>

The use of the hydraulic composition for increasing early strength according to <54>, wherein the content of the alkali metal ion in the hydraulic composition is preferably 0.05 to 1.0 parts by weight, more preferably 0.08 to 0.50 parts by weight, even more preferably 0.10 to 0.30 parts by weight, and even more preferably 0.15 to 0.25 parts by weight to 100 parts by weight of cement.

<56>

The use of the hydraulic composition for increasing early strength according to any one of <36> to <43> and <45> to <55>, wherein the hydraulic composition is concrete, and the content of water in the hydraulic composition is preferably 5 to 7.5% by weight, and more preferably 5 to 7% by weight.

<57>

The use of the hydraulic composition for increasing early strength according to any one of <36> to <42> and <44> to <55>, wherein the hydraulic composition is mortar, and the content of water in the hydraulic composition is preferably 7 to 18% by weight, more preferably 7 to 15% by weight, and even more preferably 9 to 13% by weight.

The following examples further describe and demonstrate embodiments of the present invention. The examples are given solely for the purpose of illustration and are not to be construed as limitations of the present invention.

EXAMPLES

Example 1 and Comparative Example 1

Concretes were produced using a cement (C1) as a raw material and tested (Tables 1, 2, and 2B).

Example 2 and Comparative Example 2

Concretes were produced using a cement (C2) as a raw material and tested (Tables 1 and 3).

Example 3 and Comparative Example 3

Mortars were produced using a cement (C3) as a raw material and tested (Tables 4 and 5).

Example 4 and Comparative Example 4

Mortars were produced using a cement (C3) as a raw material and tested (Tables 4 and 6).

Example 5

Concretes were produced using a cement (C1) and different glycerols as raw materials and tested (Tables 1 and 7).

(1) Preparation of Specimen (1-1) Preparation of a Concrete and a Specimen (Step 1)

In a concrete mixer, a cement, a fine aggregate, a coarse aggregate, glycerol, and gypsum dihydrate ($CaSO_4(2H_2O)$) in amounts according to each formulation condition shown in Tables 1 to 3, and 7 were pre-mixed for 10 seconds. To the mixture were added mixing water containing an AE agent and a defoaming agent such that the slump was 21±1 cm, and the air entrainment was 2±1%, and a dispersant in an amount of 1 part by weight (0.4 parts by weight of solids) to 100 parts by weight of cement. The mixing water is water which is mixed with cement. The mixture was kneaded for 90 seconds (rotation number: 45 rpm) to obtain each concrete. In Table 2B, an alkali metal sulfate was further added. The amount of glycerol and gypsum dihydrate added and the molar ratio of the sulfate ion calculated from the amount of calcium sulfate in cement to glycerol are shown in Tables 2, 2B, 3, and 7.

(Step 2)

In accordance with JIS A 1132, the concrete was used to fill a cylindrical plastic mold (diameter of bottom face: 10 cm, height: 20 cm) in a double-layer manner, and cured in the air at 20° C. to obtain a specimen.

Components of the concrete and a description of the concrete mixer are as follows.

- glycerol: purified glycerol (Kao Corporation, glycerol prepared by transesterification of palm oil)
- gypsum dihydrate: gypsum dihydrate (Wako Pure Chemical Industries, Ltd., Wako first grade)
- alkali metal sulfate: sodium sulfate (Wako Pure Chemical Industries, Ltd., Wako first grade)
- AE agent: AE02 (Kao Corporation)
- defoaming agent: defoaming agent No. 21 (Kao Corporation)
- dispersant: Mighty 150 (Kao Corporation, naphthalene-based polymer, 40% by weight of solids)
- mixing water (W): tap water containing an AE agent and a defoaming agent
- cement (C1): ordinary portland cement (Sumitomo Osaka Cement Co., Ltd., density: 3.16 g/cm$^3$, the amount corresponding to calcium sulfate and the amount of $C_3A$ in the cement are shown in Table 2.)
- cement (C2): ordinary portland cement (Sumitomo Osaka Cement Co., Ltd., density: 3.16 g/cm$^3$, the amount corresponding to calcium sulfate and the amount of $C_3A$ in the cement are shown in Table 3.)
- fine aggregate (S1): crushed sand (crushed andesite sand from Ishikawa, Kawachi-mura), density: 2.55 g/cm$^3$
- fine aggregate (S2): land sand (seaside land sand from Ishikawa, Uchinada area), density: 2.55 g/cm$^3$
- coarse aggregate (G1): crushed gravel (crushed gravel 1505 from Ishikawa, Kawachi-mura), density: 2.55 g/cm$^3$
- concrete mixer: IHI Corporation, 35-liter biaxial continuous mixer Glycerols used in Example 5 are as follows.

- crude brine (beef tallow): an aqueous solution of glycerol prepared by hydrolysis of beef tallow (12.4% by weight of solids)
- crude brine (vegetable): an aqueous solution of glycerol prepared by hydrolysis of vegetable oil (16.6% by weight of solids)
- crude brine mixture (animal and vegetable): a mixture of crude brine (beef tallow) and crude brine (vegetable) (12.6% by weight of solids)
- crude brine (distilled): a condensed product by distilling water from the crude brine mixture (animal and vegetable) (50.2% by weight of solids)
- purified brine: a purified product by subjecting the crude brine (distilled) to charcoal treatment and an ion-exchanging treatment to remove trace impurities (99.1% by weight of solids)

(1-2) Preparation of a Mortar and a Specimen (Step 1)

In a mortar mixer, cement, a fine aggregate, and glycerol in amounts according to each formulation condition shown in Tables 4 to 6 were pre-mixed for 10 seconds. To the mixture were added mixing water containing a defoaming agent such that the amount of entrained air was 2% or less and a dispersant in an amount of 0.48 parts by weight of solids to 100 parts by weight of cement. The mixture was kneaded for 1 minute at a rotation rate of 63 rpm, and for a further 2 minutes at 128 rpm to obtain each mortar. The amount of glycerol added and the molar ratio of the sulfate ion calculated from the amount of calcium sulfate in cement to glycerol are shown in Tables 5 and 6.

(Step 2)

In accordance with JIS A 1132, mortar was used to fill a cylindrical plastic mold (diameter of bottom face: 10 cm, height: 20 cm) in a double-layer manner, and cured in the air at 20° C. to obtain a specimen.

Components of the mortar and a description of the mortar mixer are as follows.

- glycerol: purified glycerol (Kao Corporation)
- defoaming agent: defoaming agent No. 21 (Kao Corporation)
- dispersant: Mighty 150 (Kao Corporation, naphthalene-based polymer)
- mixing water (W): tap water containing a defoaming agent
- cement (C3): portland cement (CEM I42,5, Heidelberger), density: 3.15 g/cm$^3$, the amount corresponding to calcium sulfate and the amount of $C_3A$ in the cement are shown in Table 5.
- cement (C4): portland cement (Siam Cement Public Company Ltd.), density: 3.15 g/cm$^3$, the amount corresponding to calcium sulfate and the amount of $C_3A$ in the cement are shown in Table 6.
- fine aggregate (S1): pit sand from Joyo, density: 2.55 g/cm$^3$
- mortar mixer: Dalton Corporation, general mixer, model: DM-03-γ

(2) Quantification of Components in Cement (2-1) Quantification of Calcium Sulfate in Cement Calcium sulfate (CaSO4) in cement was quantified with a powder X-ray diffraction system RINT-2500 (Rigaku corporation) under measurement conditions of: target: CuKα, tube current: 40 mA, tube voltage: 200 kV, 2θ range: 5 to 70 deg., scan mode: step, step width: 0.02°, and measurement time per step: 2 sec.

0.3 g of standard substance, corundum (Al2O3): AKP-100 (Sumitomo Chemical Co., Ltd.), was added to 2.7 g of cement. The peak area of the standard substance was used as a standard in quantification with a Rietveld analysis software. The software used was PDXL Ver.1.6 from Rigaku Corporation. An analysis target mineral was gypsum (dihydrate, semi-hydrate, and anhydride). The resultant value of calcium sulfate was used to calculate the amount of sulfate ion in the cement.

(2-2) Quantification of $C_3A$ in Cement $C_3A$ in cement was quantified in the same way as for calcium sulfate, except that the analysis target mineral was $C_3A$.

(3) Content of Sulfate Ion in Concrete or Mortar

Since compounds providing a sulfate ion were only cement and added gypsum dihydrate, the content of sulfate ion in the concrete or the mortar was calculated from the amount of calcium sulfate, determined by analysis of the cement, and the amount of added gypsum dihydrate in total.

(4) Content of Alkali Metal Ion in Concrete

The content of alkali metal ion in concrete was calculated from the amount of sodium sulfate added.

(5) Content of Glycerol Ion in Concrete or Mortar

The content of glycerol in concrete or mortar was calculated from the amount of glycerol used for preparing a hydraulic composition.

(6) Evaluation of Concrete or Mortar

Concrete or mortar was evaluated for demolding strength according to the following test method. Evaluation results are shown in Tables 2, 3, and 5 to 7.

(6-1) Evaluation of Specimen Strength

A cured sample was demolded from a flame after 8 hours from the preparation of concrete or mortar, and measured for compressive strength in accordance with JIS A 1108. The measured strength was considered as an 8-hour strength. Another sample was similarly cured and demolded as the sample for 8-hour strength, and stored from then to 24 hours from the preparation at 20° C. in the air, and measured for compressive strength in accordance with JIS A 1108. The measured strength was considered as a 24-hour strength. Compressive strength was represented as a strength ratio (%) to a value of strength of the standard material in Tables 2, 2B, 3, and 5 to 7. In Tables 2, 3, and 7, tests were conducted only with an AE agent, a defoaming agent, and a dispersant without glycerol and gypsum dihydrate (Comparative Example 1-1 and Comparative Example 2-1). In Tables 5 and 6, standard materials were compositions prepared only with a defoaming agent and a dispersant without glycerol (Comparative Example 4-1 and Comparative Example 5-1). In the Tables, the content and the molar ratio of sulfate ion were calculated with the molecular weight of sulfate ion ($SO_4^{2-}$) of 96. In Tables 2, 3, and 5 to 7, the amount of glycerol added was represented as the amount of solids in the glycerol added.

TABLE 1

| Material used | W | C* | S1 | S2 | G1** | Total |
|---|---|---|---|---|---|---|
| Compounding amount (kg/m³) | 155 | 320 | 679 | 170 | 997 | 2321 |
| Weight ratio (%) | 6.68 | 13.79 | 29.25 | 7.32 | 42.96 | 100 |

W/C × 100 = 48.4
*Cement (C1) or cement (C2)
**A bulk volume was 65%

TABLE 2

| | | Content in cement(C1) (weight %) | | Added amount [parts by weight to 100 parts by weight of cement (C1)] | | | Content of sulfate ion in concrete [parts by weight to 100 parts by weight of cement(C1)] | Sulfate ion/glycerol in concrete (molar ratio) | Compressive strength | | | |
|---|---|---|---|---|---|---|---|---|---|---|---|---|
| | | | | | | CaSO₄(2H₂O) | | | After 8 hours | | After 24 hours | |
| | | Sulfate ion | $C_3A$* | Glycerol | Added amount | Added amount as sulfate ion | | | Measured value (N/mm²) | Relative value (%) | Measured value (N/mm²) | Relative value (%) |
| Example | 1-1 | 2.9 | 8.8 | 0.18 | 1.5 | 0.8 | 3.7 | 20 | 3.6 | 146 | 24.9 | 134 |
| | 1-2 | 2.9 | 8.8 | 0.36 | 1.5 | 0.8 | 3.7 | 9.8 | 5.1 | 208 | 26.8 | 144 |
| | 1-3 | 2.9 | 8.8 | 0.36 | 3.0 | 1.6 | 4.5 | 12 | 4.2 | 171 | 28.7 | 154 |
| | 1-4 | 2.9 | 8.8 | 0.54 | 1.5 | 0.8 | 3.7 | 6.5 | 4.7 | 190 | 27.9 | 150 |
| Comparative example | 1-1 | 2.9 | 8.8 | 0 | 0 | 0.0 | 2.9 | — | 2.5 | 100 | 18.6 | 100 |
| | 1-2 | 2.9 | 8.8 | 0.10 | 3.0 | 1.6 | 4.5 | 43 | 2.6 | 105 | 23.8 | 128 |
| | 1-3 | 2.9 | 8.8 | 1.0 | 0 | 0.0 | 2.9 | 2.7 | 1.7 | 68 | 9.3 | 50 |
| | 1-4 | 2.9 | 8.8 | 1.5 | 3.0 | 1.6 | 4.5 | 2.9 | 1.8 | 74 | 20.9 | 112 |
| | 1-5 | 2.9 | 8.8 | 1.0 | 1.5 | 0.8 | 3.7 | 3.5 | 3.4 | 137 | 25.3 | 136 |
| | 1-6 | 2.9 | 8.8 | Triethanolamine** 1.0 | 1.5 | 0.8 | 3.7 | — | 2.5 | 101 | 24.6 | 132 |

*A content of $C_3A$ in concrete was 1.2% by weight.
**Triethanolamine was listed in the column of glycerol for convenience.

| | | Content of cement(C1) (weight %) | | Added amount [parts by weight to 100 parts by weight of cement(C1)] | | | | | Content of sulfate ion in concrete [parts by weight to 100 parts by weight of cement(C1)] | Sulfate ion/ glycerol in concrete (molar ratio) | Compressive strength | | | |
|---|---|---|---|---|---|---|---|---|---|---|---|---|---|---|
| | | | | | CaSO₄(2H₂O) | | Alkali metal sulfate | | | | | After 8 hours | | After 24 hours | |
| | | Sulafte ion | C₃A* | Glyc- erol | Add- ed as a- mount | Added amount as sulfate ion | Add- ed as a- mount | Added amount as alkali metal ion | Added amount as sulfate ion | | | Measured value (N/mm²) | Relative value (%) | Measured value (N/mm²) | Relative value (%) |
| Ex- am- ple | 1-5 | 2.9 | 8.8 | 0.18 | 0.00 | 0.00 | 0.54 | 0.18 | 0.36 | 3.3 | 17.4 | 6.7 | 271 | 27.2 | 146 |
| | 1-6 | 2.9 | 8.8 | 0.36 | 1.50 | 0.84 | 0.54 | 0.18 | 0.36 | 4.1 | 10.9 | 9.9 | 403 | 31.2 | 167 |
| | 1-7 | 2.9 | 8.8 | 0.36 | 0.90 | 0.50 | 0.54 | 0.18 | 0.36 | 3.8 | 10.0 | 9.5 | 387 | 31.0 | 166 |
| | 1-8 | 2.9 | 8.8 | 0.36 | 1.20 | 0.67 | 0.27 | 0.09 | 0.18 | 3.8 | 10.0 | 7.4 | 302 | 28.8 | 154 |
| | 1-9 | 2.9 | 8.8 | 0.54 | 1.50 | 0.84 | 0.54 | 0.18 | 0.36 | 4.1 | 7.3 | 9.8 | 399 | 31.8 | 171 |

*Content of C₃A in concrete was 1.2% by weight.

| | | Content of cement(C2) (weight %) | | Added amount [parts by weight to 100 parts of cement(C2)] | | | Content of sulfate ion in concrete [parts by weight to 100 parts by weight of cement(C2)] | Sulfate ion/ glycerol in concrete (molar ratio) | Compressive strength | | | |
|---|---|---|---|---|---|---|---|---|---|---|---|---|
| | | | | | CaSO₄(2H₂O) | | | | After 8 hours | | After 24 hours | |
| | | Sulfate ion | C₃A* | Glycerol | Added amount | Added amount as sulfate ion | | | Measured value (N/mm²) | Relative value (%) | Measured value (N/mm²) | Relative value (%) |
| Ex- am- ple | 2-1 | 2.4 | 7.7 | 0.32 | 1.0 | 0.6 | 3.0 | 8.9 | 5.0 | 263 | 22.5 | 135 |
| | 2-2 | 2.4 | 7.7 | 0.35 | 3.7 | 2.1 | 4.5 | 12 | 3.8 | 200 | 23.8 | 143 |
| | 2-3 | 2.4 | 7.7 | 0.54 | 3.7 | 2.1 | 4.5 | 7.9 | 4.1 | 216 | 23.5 | 141 |
| | 2-4 | 2.4 | 7.7 | 1.0 | 5.0 | 2.8 | 5.2 | 5.0 | 3.3 | 174 | 23.1 | 138 |
| Com- para- tive ex- am- ple | 2-1 | 2.4 | 7.7 | 0 | 0 | 0.0 | 2.4 | — | 1.9 | 100 | 16.7 | 100 |
| | 2-2 | 2.4 | 7.7 | 0.10 | 0 | 0.0 | 2.4 | 23 | 2.1 | 111 | 17.1 | 102 |
| | 2-3 | 2.4 | 7.7 | 0.10 | 0.1 | 0.1 | 2.5 | 24 | 2.4 | 126 | 17.0 | 102 |
| | 2-4 | 2.4 | 7.7 | 0.18 | 0 | 0.0 | 2.4 | 13 | 2.3 | 121 | 16.9 | 101 |
| | 2-5 | 2.4 | 7.7 | 0.18 | 3.7 | 2.1 | 4.5 | 24 | 2.0 | 105 | 21.1 | 126 |
| | 2-6 | 2.4 | 7.7 | 0.54 | 0 | 0.0 | 2.4 | 4.3 | 2.6 | 137 | 16.5 | 99 |
| | 2-7 | 2.4 | 7.7 | 0.74 | 0 | 0.0 | 2.4 | 3.1 | 2.4 | 126 | 14.1 | 84 |
| | 2-8 | 2.4 | 7.7 | 1.7 | 3.7 | 2.1 | 4.5 | 2.6 | 2.2 | 116 | 15.8 | 95 |
| | 2-9 | 2.4 | 7.7 | 1.4 | 3.7 | 2.1 | 4.5 | 3.1 | 2.5 | 132 | 19.6 | 117 |
| | 2-10 | 2.4 | 7.7 | 0 | 3.0 | 1.7 | 4.1 | — | 1.6 | 83 | 18.4 | 110 |

*Content of C₃A in a concrete is 1.1% by weight.

TABLE 4

| Material used | W | C* | S1 | Total |
|---|---|---|---|---|
| Compounding amount (kg/m³) | 280 | 700 | 1220 | 2200 |
| Weight ratio (%) | 12.73 | 31.82 | 55.45 | 100 |

W/C × 100 = 40

*cement (C3) or cement (C4)

TABLE 5

| | | Content in cement(C3) (weight %) | | Added amount [parts by weight to 100 parts by weight of cement(C3)] | | Content of sulfate ion in mortar [parts by weight to 100 parts by weight of cement(C3)] | Sulfate ion/ glycerol in mortar (molar ratio) | Compressive strength | |
|---|---|---|---|---|---|---|---|---|---|
| | | | | | | | | After 8 hours Relative value (%) | After 24 hours Relative value (%) |
| | | Sulfate ion | $C_3A$* | Glycerol | $CaSO_4(2H_2O)$ | | | | |
| Example | 3-1 | 5.8 | 7.2 | 0.67 | 0 | 5.8 | 8.3 | 298 | 118 |
| Comparative example | 3-1 | 5.8 | 7.2 | 0 | 0 | 5.8 | — | 100 | 100 |

*A content of $C_3A$ in a mortar was 2.3% by weight.

TABLE 6

| | | Content in cement(C4) (weight %) | | Added amount [parts by weight to 100 parts by weight of cement(C4)] | | Content of sulfate ion in mortar [parts by weight to 100 parts by weight of cement(C4)] | Sulfate ion/ glycerol in mortar (molar ratio) | Compressive strength | |
|---|---|---|---|---|---|---|---|---|---|
| | | | | | | | | After 8 hours Relative value (%) | After 24 hours Relative value (%) |
| | | Sulfate ion | $C_3A$* | Glycerol | $CaSO_4(2H_2O)$ | | | | |
| Example | 4-1 | 4.0 | 5.8 | 0.67 | 0 | 4.0 | 5.7 | 243 | 112 |
| Comparative example | 4-1 | 4.0 | 5.8 | 0 | 0 | 4.0 | — | 100 | 100 |

*Content of $C_3A$ in mortar was 1.8% by weight.

TABLE 7

| Example | Content in cement(C1) (weight %) Sulfate ion | Kind of glycerol | Added amount [parts by weight to 100 parts by weight of cement(C1)] | | | Content of sulfate ion in concrete [parts by weight to 100 parts by weight of cement(C1)] | Sulfate ion/glycerol in concrete (molar ratio) | Compressive strength | | | |
|---|---|---|---|---|---|---|---|---|---|---|---|
| | | | | $CaSO_4(2H_2O)$ | | | | After 8 hours | | After 24 hours | |
| | | | Glycerol | Added amount | Added amount as sulfate ion | | | Measured value (N/mm²) | Relative value (%) | Measured value (N/mm²) | Relative value (%) |
| 1-2 | 2.9 | Glycerol | 0.36 | 1.5 | 0.8 | 3.7 | 9.8 | 5.1 | 208 | 26.8 | 144 |
| 5-1 | 2.9 | Crude brine (beef tallow) | 0.36 | 1.5 | 0.8 | 3.7 | 9.8 | 5.0 | 204 | 27.0 | 145 |
| 5-2 | 2.9 | Crude brine (vagetable) | 0.36 | 1.5 | 0.8 | 3.7 | 9.8 | 4.9 | 200 | 28.5 | 153 |
| 5-3 | 2.9 | Crude brine mixture (animal and vegetable) | 0.36 | 1.5 | 0.8 | 3.7 | 9.8 | 4.7 | 192 | 27.0 | 145 |
| 5-4 | 2.9 | Crude brine (distilled) | 0.36 | 1.5 | 0.8 | 3.7 | 9.8 | 4.7 | 192 | 27.4 | 147 |
| 5-5 | 2.9 | Purified brine | 0.36 | 1.5 | 0.8 | 3.7 | 9.8 | 4.5 | 184 | 27.0 | 145 |

*Content of $C_3A$ in concrete was 1.2% by weight.

Compositions of concrete and a mortar in the Examples are for secondary products. For providing a cured article that can be demolded after about 8 hours of preparation without steam curing and having a high 24-hour strength, the cured article preferably has a relative strength after 8 hours not less than 145%, more preferably not less than 170%, and even more preferably not less than 250%, and also has a relative strength after 24 hours of not less than 110%.

As shown in the Tables, a hydraulic composition in which the content of sulfate ion was 3.0 to 15 parts by weight and the molar ratio of sulfate ion/glycerol was 5.0 to 20 according to the present invention provided a cured article having a relative strength after 8 hours over 145% and a relative strength after 24 hours over 110%, or the cured article could exhibit sufficient strength after both 8 hours and 24 hours. In contrast, a hydraulic composition in which the content of sulfate ion or the molar ratio of sulfate ion/glycerol was outside the range of the present invention provided a cured article having an inferior relative strength after 8 hours and 24 hours to that of the present invention (the Examples). From Tables 2 and 2B, it is seen that addition of an alkali metal ion further enhances a relative strength after 8 hours and 24 hours.

In Tables 5 and 6, it is seen that use of cements containing a sulfate ion in amounts of 5.8% by weight and 4.0% by weight, respectively, enhance the relative strength after 8 hours and 24 hours by controlling the added amount of glycerol to bring the ratio of sulfate ion/glycerol within the range of the present invention, even without adding a sulfate as the source of sulfate ion.

As shown in Table 7, compositions prepared with different glycerols achieve a relative strength not less than 180% after 8 hours and not less than 140% after 24 hours. Results show that any kind of glycerol can be used.

The hydraulic composition according to the present invention can provide a cured article having increased 8-hour strength and 24-hour strength without thermal curing.

The invention claimed is:

1. A method for producing a cured article of a hydraulic composition, comprising the steps of:
   step 1 of preparing a hydraulic composition by mixing glycerol, cement, aggregate and water, the hydraulic composition comprising a sulfate ion, such that a molar ratio of sulfate ion to glycerol, sulfate ion/glycerol, is 5.0 to 20 and the content of sulfate ion is 3.0 to 15 parts by weight to 100 parts by weight of cement; and
   step 2 of aging and curing the hydraulic composition obtained in the step 1.

2. The method for producing a cured article according to claim 1, wherein a sulfate is further added in the step 1.

3. The method for producing a cured article according to claim 1, wherein the glycerol is mixed in an amount of 0.15 to 1.3 parts by weight to 100 parts by weight of cement in the step 1.

4. The method for producing a cured article according to claim 1, wherein the cement comprises calcium aluminate in an amount of 1.0 to 2.5% by weight of the hydraulic composition.

5. The method for producing a cured article according to claim 1, wherein the hydraulic composition is held at a curing temperature of not less than 50° C. for not more than one hour in step 2.

6. The method for producing a cured article according to claim 2, wherein the amount of the added sulfate is 0.1 to 12 parts by weight to 100 parts by weight of cement.

7. The method for producing a cured article according to claim 1, wherein the molar ratio of the sulfate ion to the glycerol, sulfate ion/glycerol, is 5.0 to 12.

8. The method for producing a cured article according to claim 1, wherein the hydraulic composition contains an alkali metal ion.

9. A hydraulic composition, comprising a sulfate ion, prepared by mixing glycerol, cement, aggregate and water, wherein the content of the sulfate ion in the hydraulic composition is 3.0 to 15 parts by weight to 100 parts by weight of cement, and the molar ratio of the sulfate ion to the glycerol in the hydraulic composition, sulfate ion/glycerol, is 5.0 to 20.

10. The hydraulic composition according to claim 9, further comprising an additional sulfate.

11. The hydraulic composition according to claim 9, wherein the content of the glycerol in the hydraulic composition is 0.15 to 1.3 parts by weight to 100 parts by weight of cement.

12. The hydraulic composition according to claim 9, wherein the cement comprises $C_3A$, and the content of the $C_3A$ in the hydraulic composition is 1.0 to 2.5% by weight.

13. The hydraulic composition according to claim 9, wherein the hydraulic composition is concrete, and the content of water in the hydraulic composition is 5 to 8% by weight.

14. The hydraulic composition according to claim 9, wherein the hydraulic composition is a mortar, and the content of water in the hydraulic composition is 5 to 25% by weight.

15. The hydraulic composition according to claim 9, wherein an amount of an added sulfate is 0.1 to 12 parts by weight to 100 parts by weight of cement.

16. The hydraulic composition according to claim 9, wherein the molar ratio of the sulfate ion to the glycerol, sulfate ion/glycerol, is 5.0 to 12.

17. The hydraulic composition according to claim 9, wherein the hydraulic composition contains an alkali metal ion.

18. The method for producing a cured article according to claim 2, wherein the sulfate is an inorganic sulfate.

19. The method for producing a cured article according to claim 1, wherein the cement comprises $C_3A$ in an amount of 1.0 to 2.5% by weight of the hydraulic composition.

20. The hydraulic composition according to claim 10, wherein the sulfate is an inorganic sulfate.

* * * * *